United States Patent [19]
Rosen

[11] 3,890,545
[45] June 17, 1975

[54] TRAVELING-WAVE-TUBE PROTECTION CIRCUIT

[75] Inventor: Robert Rosen, Granada Hills, Calif.

[73] Assignee: The United States of America as represented by the Secretary of the Navy, Washington, D.C.

[22] Filed: Apr. 12, 1974

[21] Appl. No.: 460,317

[52] U.S. Cl................... 317/51; 315/3.5; 317/27 R; 317/36 TD; 328/8; 328/9; 330/207 P; 330/43
[51] Int. Cl.² .......................................... H02H 7/20
[58] Field of Search ............... 315/3.5; 328/8, 9, 10; 330/43, 207 P; 317/51, 27 R, 36 TD Primary Examiner—Saxfield Chatmon, Jr.
Attorney, Agent, or Firm—R. S. Sciascia; P. Schneider; N. Brown

[57] ABSTRACT

A protection circuit to detect a malfunction condition of a traveling wave tube by monitoring both the current flowing from the slow-wave structure into the tube body and current flowing in the collector of the tube. The protection circuit produces a fault signal upon detection of current flowing in the body portion of the tube which exceeds a predetermined threshold, or upon detection of current flowing in the collector which does not exceed a predetermined threshold. The fault signal thus generated is utilized to initiate shutdown of power to the traveling wave tube, thereby protecting the traveling wave tube from distructive current.

A feature of this invention is an improved d.c. restorer circuit utilizing a differential amplifier in conjunction with diode feedback to charge a capacitor to a voltage essentially equal to the most negative going excursion of an input signal.

This voltage stored in the capacitor is added to the voltage applied at the input of the restorer to produce the restored voltage at its output.

9 Claims, 12 Drawing Figures

TRAVELING-WAVE-TUBE PROTECTION CIRCUIT

FIELD OF INVENTION

The present invention relates to protection circuits for electronic devices, and more particularly to protection circuits for gridded traveling wave tubes.

BACKGROUND OF THE INVENTION

Various means have been used to monitor the operating condition of traveling-wave tubes. A typical technique used is the monitoring of tube body current. When the slow wave structure intercepts the electron beam (a malfunction condition), a current is induced in the slow wave structure. This current flows from the slow wave structure into the body of the tube, and is termed "body current". Although useful, body-current sensing alone does not provide detection of some types of faulty operating conditions which are damaging to traveling-wave tubes. For example, a failure which is not easily detected by body-current sensing alone could be caused by a breakdown of the grid modulator. Such a breakdown may cause the grid-bias to be at zero volts, causing a resultant condition in which the current in the collector is at a potentially destructive level, but where total body current is normal. A similar failure of this nature could be caused by other malfunctions, as for example by an open (i.e. break) in the grid lead. Another failure which most likely would not be detected by body current sensing alone is a condition in which the grid of the traveling wave tube is biased by a d.c. voltage--which causes the body current to be a constant value. This constant value current would appear as zero (not excessive) at a secondary of a current-sensing transformer whose primary winding is in series with the monitored current path.

Additional information as to the malfunction condition of the traveling-wave tube may be provided by sensing and monitoring current in the collector of the tube. In light of the foregoing, and other reasons, it is important to be able to accurately monitor both current in the collector and current in the tube body.

Although collector undercurrent sensing can be helpful in supplying additional information relating to a malfunction condition of the tube, it is not generally used because of inaccuracies inherent in prior monitoring schemes. These schemes tend to give an erroneous indication of the value of the current being monitored, and thereby tend to cause a false indication of tube malfunction condition. Many traveling-wave-tube circuit applications require that collector-current sensing be accomplished within the cathode power-supply portion of the tube circuitry. This necessitates using a high-voltage isolation transformer to sense current flowing in the high-voltage circuit monitored. Since the transformer does not transmit the d.c. level of a current flowing in its primary, it is necessary to restore this level. Only then can the signal from the transformer secondary indicate the true peak value of current being sampled in the transformer primary.

Prior d.c. restorer circuits have utilized various restoring techniques including diode-resistor-capacitor arrangements to accomplish the d.c. restoration. These circuits are objectionable because of their inherent inaccuracy. One cause of this inaccuracy arises in the diode used to pass a negative signal and block a positive one. The diode has an undersired effect resulting in a varying reduction of the restorer output voltage. This variation of the output voltage arises from the fact that current flowing through the diode causes a voltage drop across it, which in turn reduces the voltage at the output. This voltage drop varies with applied voltage, temperature, and other factors which are difficult or costly to compensate for.

The d.c. restorer of the present invention essentially eliminates the error introduced by the diode voltage drop through utilization of a feedback amplifier which allows a capacitor to closely follow the negative-going excursion of the input signal with virtually no voltage error (e.g., within 2%).

Elimination of the voltage error is especially important when small currents are being sensed by a current-sensing transformer whose output must be d.c. restored. This output is then a low-level voltage signal. Without the accuracy provided by the restorer of this invention, proper sensing of body and collector currents would not only be much more difficult, but erroneous indication of current would tend to result. Furthermore, when a d.c. restorer of the prior-type is used in conjunction with transformer current sampling, the voltage at the output of the transformer must be about an order of magnitude (i.e., 10 times) larger than the anticipated restorer voltage error (so that reasonable accuracy in determining the peak current sensed can be maintained). But this requirement for a relatively large transformer output voltage necessitates a relatively large transformer. With a larger transformer, high frequency response becomes degraded--especially when a wide variation in repetition frequency or pulse width of the sampled signal is encountered. This degraded performance tends to limit accuracy of restorer circuits of this nature to the order of about 15% of the current being sensed.

Prior-art d.c. restorers also contain transient errors in their outputs because of charging and discharging of the restorer-capacitor. These transients can result in inaccurate indication of the current sensed. This is especially a problem if a significant voltage overshoot develops as a consequence of rapid change in signal pulse repetition frequency.

SUMMARY OF THE INVENTION

Protection of a traveling-wave tube is provided by sensing of both body and collector currents, and upon determination that at least one of the sensed currents is not within a predetermined value, generating a fault signal. The fault signal is used to initiate shutdown of the grid modulator and the tube power supplies. Signal integration is included to reduce the tendency of the protection circuit to generate a fault signal which may otherwise arise from spurious transient noise signals.

OBJECTS OF THE INVENTION

It is a general object of the present invention to provide a protective circuit for monitoring both collector current and body current in a Traveling Wave Tube.

It is another object of this invention to accurately restore a d.c. component to a transformer sampled signal.

It is a further object of this invention to restore a d.c. voltage to signals on the order of one-half volt without introducing any appreciable error (in the form of a constant voltage shift of ofset, or otherwise).

Yet another object of the present invention is to utilize a small coupling transformer to sample an a.c. signal in a high voltage circuit to be monitored.

Other objects, advantages and novel features of the present invention will become apparent from the following detailed description of the invention when considered in conjunction with the accompanying drawing.

BRIEF DESCRIPTION OF THE DRAWINGS

FIG. 4b illustrates a typical waveform present at the output of the sampling transformer, corresponding to the input waveform to the transformer primary shown in FIG. 4a.

DETAILED DESCRIPTION OF THE INVENTION

Figure 1:
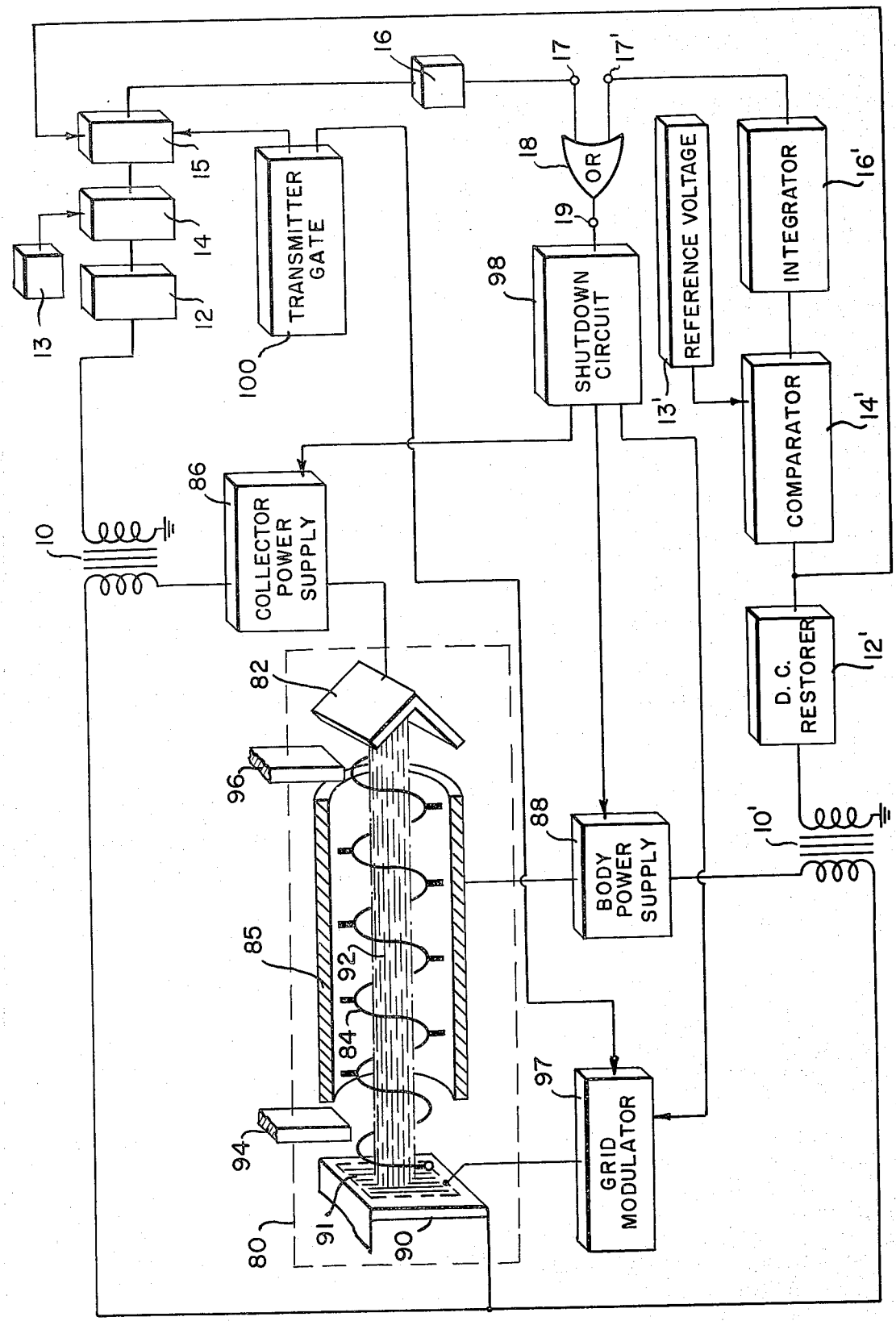
FIG. 1 is a functional-schematic diagram of a helix-type gridded traveling wave tube in a circuit with a power-supply, grid modulator, means to monitor both collector and body currents, and tube protection means according to the present invention.

A traveling-wave tube 80 is shown pictorially in phantom in FIG. 1. It includes among other elements a collector 82, a slow-wave structure such as a helix 84 attached to the body 85 of the tube, and a cathode 90. The collector and body are respectively connected to power supplies 86 and 88, so that an electron beam 92 may flow from the cathode 90 to the collector 82. A radio-frequency signal may be introduced to the helix at an input means 94 and removed at an output means 96. A grid-modulator 97 is connected to a grid 91. The modulator serves to modulate the grid voltage and thereby to modulate the electron beam, which imparts much of its energy to the r.f. wave traveling parallel to the slow-wave structure. Any conventional traveling-wave-tube grid-modulator may be used for this purpose. The grid-modulator 97 is also connected to a tube transmitter-gate 100, utilized to turn the grid modulator on and off.

The electron beam 92 is usually confined by a magnetic focusing structure (not shown) which produces an electro-magnetic field which concentrates the electron beam and prevents it from spreading and impinging on the helix. If the electron beam becomes misfocused and intercepts the helix 84, a potentially destructive current will be induced to flow in the helix. The level of the intercepted beam-current flowing in the slow-wave structure is of course a function of the number of electrons intercepted. If an appreciable portion of the beam is intercepted, the resulting current will cause heating and destruction of the helix. To provide a thermal path for removing heat generated within the slow-wave structure 84, it is usually physically connected to the tube body. Thus, current arising from the interception of the beam flows from the slow-wave structure 84, thru connectors 87, through the tube body 85 and body power supply 88 to the cathode 90. This intercepted current flowing in the slow-wave structure and into the tube body shall be referred to as "body current".

In accordance with the invention, sensing transmformers 10, 10' are utilized to sense current in the collector and body portions respectively of the traveling-wave-tube system. The output of each transformer is coupled to a d.c. restorer 12 or 12', comparator 14 or 14' (each having a respective reference voltage generator 13, 13'), and integrator 16 or 16', each respectively connected in the order recited. A collector monitor-gate 15 is added in the collector-sensing circuit to enable fault sensing only during the period when the transmitter tube is being pulsed or when body current is sensed. Inputs of the collector monitor-gate 15 are connected to transmitter gate 100, and to the output of the body current sensing path at the output of the d.c. restorer 12'. In this way, a signal, if present at the input of gate 15, is allowed to pass to its output only upon receipt of a signal from either transmitter gate 100 or the output of the body current path d.c. restorer 12'. The output of each integrator is connected to a corresponding input 17 or 17' of a decision circuit, such as an "OR" circuit 18, having an output terminal 19. Tube shutdown means 98, has its input connected to output terminal 19, and its output connected to the shutdown terminals of the grid-modulator 97, and body and collector power supplies 86 and 88.

The operation of the present invention will now be described. When it is desired to pulse the traveling-wave tube, the transmitter gate 100 is made to produce an output signal which is provided to the grid modulator 97 and collector monitor gate 15. This signal, when received by the grid modulator, allows the electron beam 92 to pass; when received by the collector monitor gate 15, the transmitter gate signal causes the collector monitor gate to open, thus allowing any signal that may be present at the output of comparator 14 to pass to the input of integrator 16.

An abnormal amount of current flowing in the traveling-wave tube is indicative of faulty and potentially destructive operation of the tube — either too high a body current or too low a collector current. If an abnormal current level persists for a period of time (e.g. 100 microseconds), it indicates that a potentially destructive tube condition exists which most likely does not arise from a transient condition or "noise."

The current flowing in either the body or collector current path is sensed by substantially identical circuitry, although some component values will be different in order to provide for setting different desired thresholds. Furthermore, as has been described, gating circuitry is required to control current monitoring in the collector circuit. Therefore it shall be understood that the following description of current sensing is basically applicable to detection and monitoring of either collector or body current.

Figure 4A:
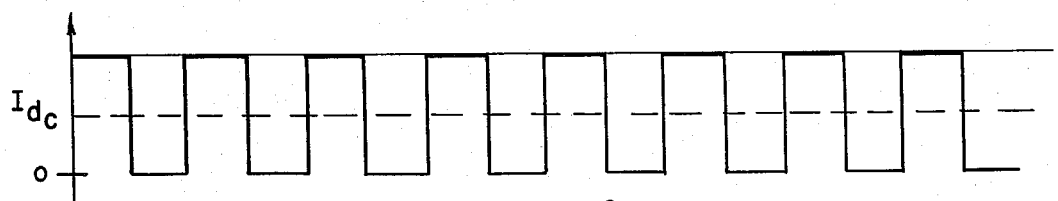
FIG. 4a illustrates a typical waveform present in the primary winding of a current path to be monitored.
Figure 4B:
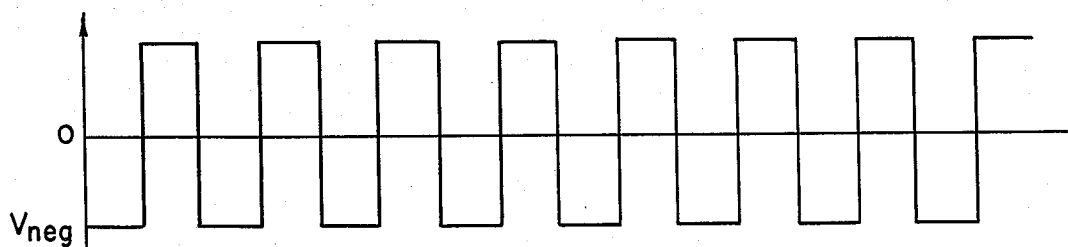
Figure 4C:
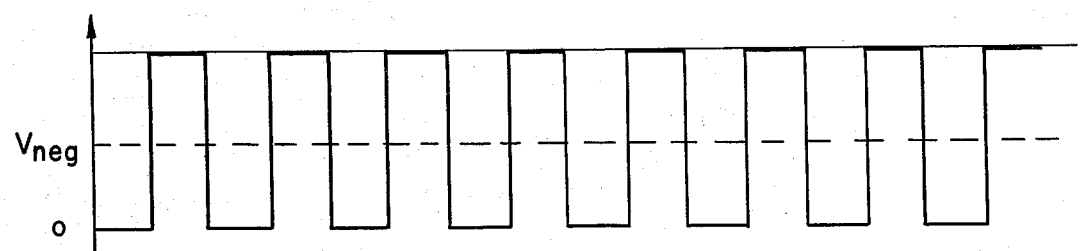
FIG. 4c illustrates a typical waveform present at the output of the d.c. restorer corresponding to the waveform present at the output of the sampling transformer as illustrated in FIG. 4b.
Figure 5A:
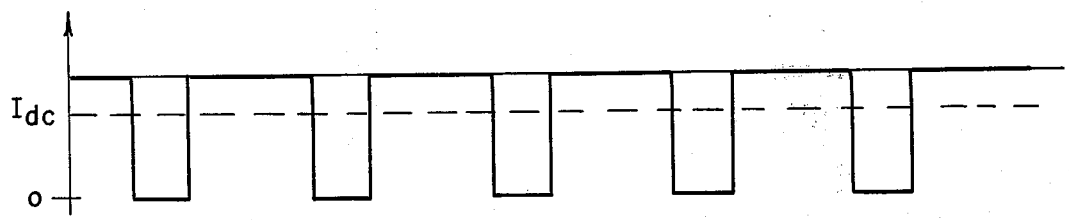
FIGS. 5 a, b, and c are illustrative of another set of waveforms similar to that of FIGS. 4 a, b, and c occurring under a different set of grid modulator conductions.
Figure 5B:
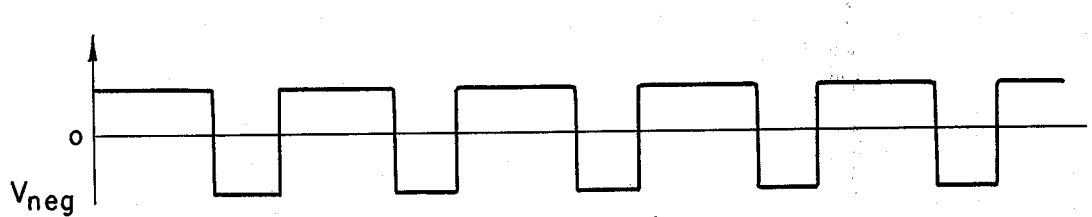
Figure 5C:
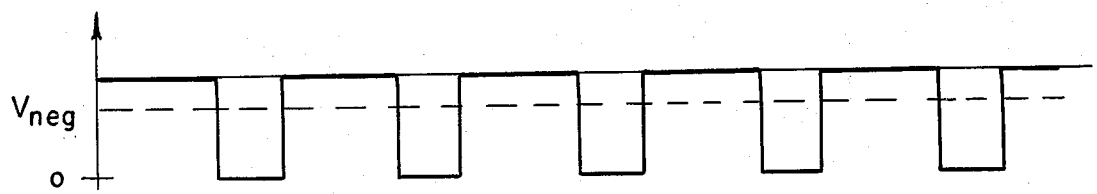
Figure 6A:
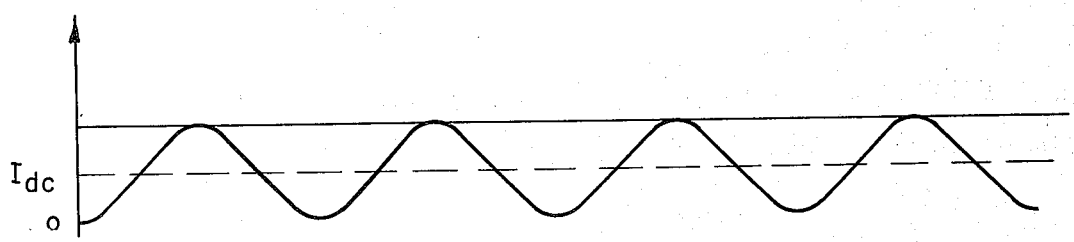
FIGS. 6 a, b, and c are also illustrative of another set of waveforms similar to that of FIG. 4 a, b, and c occurring under still another set of grid modulator conditions.
Figure 6B:
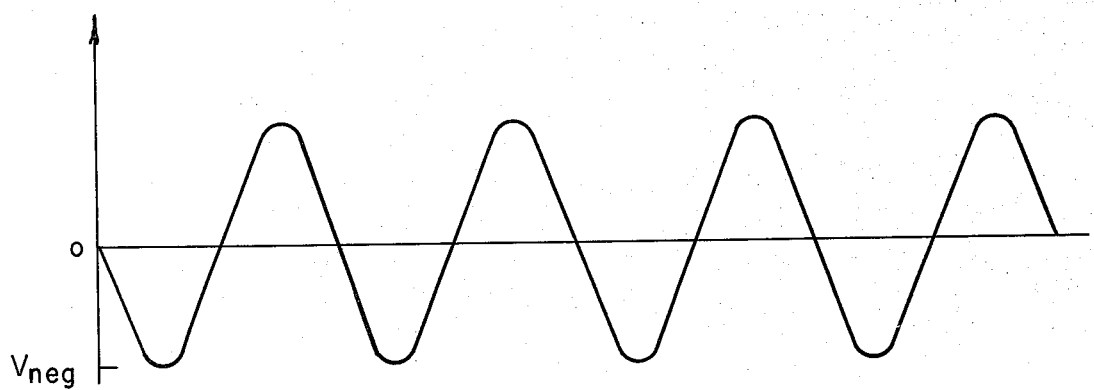
Figure 6C:
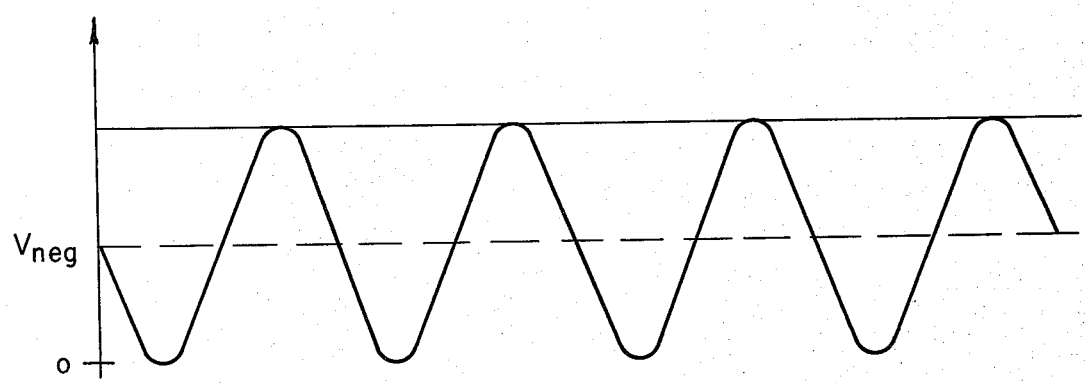

A typical waveform of current flowing in a current path to be monitored, as for example, either the collector power supply path or body power supply path, is shown in FIG. 4a. The current flowing in the path to be monitored passes through the primary winding of a sensing transformer, for example 10. The a.c. waveform of this current is then substantially faithfully reproduced at the secondary of the transformer (as illustrated in FIG. 4b) although any d.c. component of current present in the input waveform in the transformer primary is not transmitted and is thus not present at the output of the secondary winding. The output voltage signal from the secondary winding of the sensing transformer is then applied to the d.c. restorer 12 (which is a feature of this invention, the details of which are described later). The d.c. restorer then addes another signal to the input signal; this other added signal has a voltage which is representative of the d.c. component of current present in the primary winding of the transformer. The output voltage signal of the d.c. restorer is thus indicative of the actual amount of current flowing in the monitored current path. This restored signal is shown in FIG. 4c. Other waveforms typically found in either the collector power supply 86 current path, or the body power supply 88 current path are illustrated in FIGS. 5a and 6a respectively. These waveforms would be present if the grid modulator 97 were adjusted to produce them. FIGS. 5b and 6b show the waveforms at the secondary of sensing transformer 10 for the respective input waveforms of FIGS. 5a and 6a. The corresponding output of the d.c. restorer 12 is shown respectively in FIGS. 5c and 6c.

The restored signal from the output of the d.c. restorer circuit is then applied to the comparator, for example 14, which compares the applied signal with a reference signal from the reference voltage source 13 having a value representative of a predetermined threshold of current allowable in the monitored current path. If the sensed current exceeds the allowed current threshold, the comparator will generate a signal to indicate an abnormal current condition, and this comparator signal is then applied to the integrator, for example 16.

If the signal at the input of the integrator 16 remains present for longer than a predetermined period of time (e.g. 100 microseconds) the integrator will generate a fault occurence signal. This requirement that the signal be present for longer then a certain minimum time reduces the tendency of the protection circuit to generate a fault signal if the abnormal current condition is present for only a short, transient period (which would not be destructive of the tube), or if the abnormal current signal were caused by transient noise.

The output of integrator 16 is applied to an input 17 of a decision circuit, such as OR circuit 18, which produces an output signal whenever at least one of its input receives a signal. The output signal from the OR circuit causes the protective shutdown circuit 98 to quickly turn off (e.g., 10–50 milliseconds) power supplies 88 and 86, connected to the tube body 85 and the collector 82 respectively. It also causes the grid-modulator 97 to stop pulsing the tube. Termination of power to the tube may be accomplished by operating a switch placed in the power supply circuit so as to disconnect it from the tube. This switch may be operated by a voltage signal from the shutdown means circuitry which activates a suitable voltage controlled switch. It should be noted that any suitable voltage-responsive switch, as for example a relay or silicon-controlled rectifier, may be used for this purpose. In a similar fashion, the grid of the tube may be connected to a high-voltage negative potential by operating an electronic switch in the grid-modulator circuit.

Figure 2:
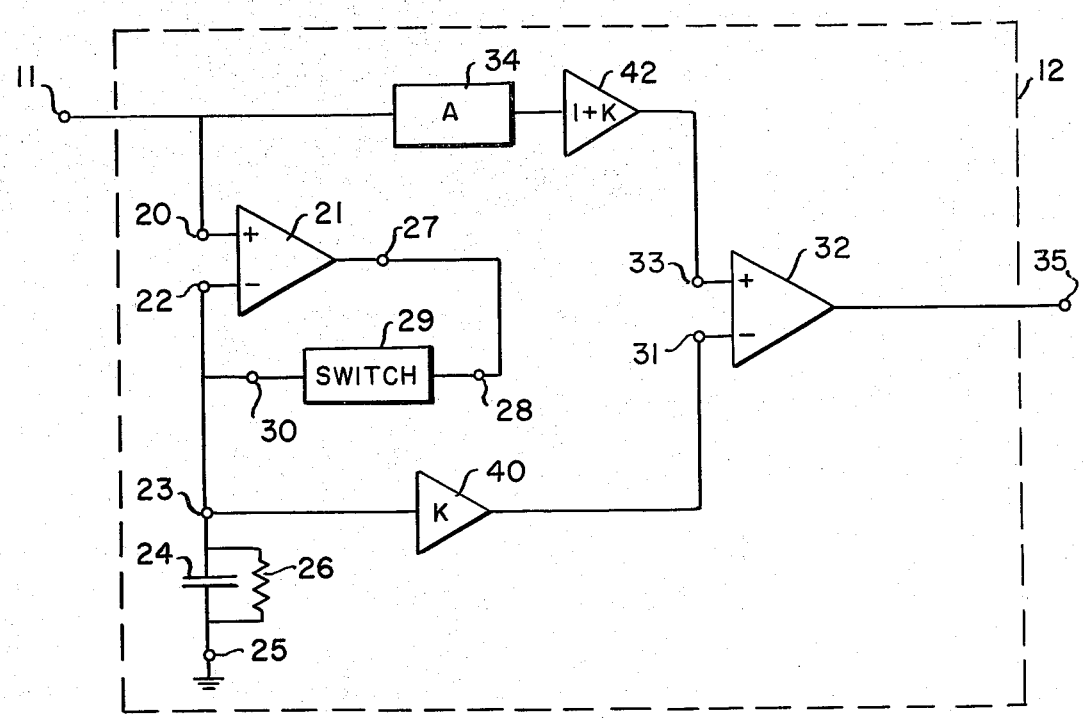
FIG. 2 is a schematic diagram of an embodiment of the d.c. restorer of the present invention.

An embodiment of the restorer circuit of the present invention is shown in FIG. 2. An input terminal 11 is connected to the non-inverting input terminal 20 of a differential amplifier 21 of unity gain. Output terminal 27 of the differential amplifier 21 is connected to terminal 28 of an electronic switch 29. The other terminal 30 of the electronic switch is connected to the inverting input terminal 22 of the differential amplifier 21. Also connected to inverting input 22 is terminal 23 of capacitor 24. The other terminal 25 of the capacitor 24 is connected to a second reference potential such as ground. A resistor 26 is connected across the capacitor 24. The terminal 23 of the capacitor 24 is connected to an operational amplifier 40 having a gain of K whose output is connected to the inverting input terminal 31 of a second differential amplifier 32. Attenuator 34, having on attenuation factor A, is connected at one terminal to restorer input terminal 11, and is connected at its other terminal to the input of operational amplifier 42 which has a gain of "1+K". The output of operational amplifier 42 is connected to the non-inverting input terminal 33 of differential amplifier 32. The output terminal 35 of differential amplifier 32 forms the output of the d.c. restorer 12 of the present invention.

Operation of the d.c. restorer is as follows: A voltage signal, for example FIG. 4b, is applied to restorer input terminal 11 connected to the non-inverting input terminal 20 of differential amplifier 21. When the voltage at this terminal is more negative than the voltage of the inverting input 22, the voltage at the output terminal 27 of the differential amplifier 21 becomes negative with respect to ground.

Normally open electronic switch 29 is so constructed that it is opened only when the voltage at its terminal 28 is more positive than the voltage at its terminal 30. Thus, when the voltage at the output terminal 27 is more negative than the voltage stored on the capacitor 24 and present at capacitor terminal 23, the electronic switch 29 closes and allows current to flow from the second reference potential through capacitor 24 and electronic switch 29 into the output terminal 27 of the differential amplifier 21. This current acts to charge capacitor 24 and therefore cause the voltage across it to become more negative with respect to ground. Thus, when the voltage at inverting input terminal 22 becomes equal to or more negative than the voltage at the non-inverting input terminal 20, the voltage at the output terminal 27 becomes positive causing electronic switch 29 to open and thereby stop charging of capacitor 24. In this way, the voltage stored on the capacitor becomes essentially equal to the most negative value of the input terminal 11.

The voltage stored on the capacitor is applied to operational amplifier 40, which amplifies the voltage by its amplification factor K. The amplified voltage is then applied to inverting imput terminal 31 of the second differential amplifier 32. Thus the inverting input terminal 31 of the differential amplifier 32 has a voltage applied to its which is equal to the most negative going excursion of the restorer input signal multiplied by the amplification factor K.

If the voltage at the restorer input 11 is denoted as "$V_{in}$," the most negative-going voltage at that input denoted as "$V_{neg}$," and the voltages present at input terminals 31 and 33 are denoted as "$V_{31}$" and "$V_{33}$" respectively, then the voltage at the inverting input terminal 31 may be expressed as:

$$V_{31} = K(V_{neg})$$

The voltage at input terminal 11 is applied to the non-inverting terminal 33 of the second differential amplifier 32 through attenuator 34 and operational amplifier 42. The attenuator reduces the voltage through it by its attenuation factor A, while the amplifier amplifies the voltage by its amplification factor of 1+K. Thus the voltage present at the non-inverting input terminal 33 is equal to the input voltage multiplied by these two factors, and thus may be expressed as: $V_{33} = A(k+1)(V_{in})$. Since the voltage at output terminal 35 of differential amplifier 32 is equal to the difference between its inputs 31 and 33 (since the gain of the differential amplifier is unity), the voltage at output terminal 35 of the restorer 32 may be expressed as:

$$V_o = [V_{33} - V_{31}]$$

Substituting the values of $V_{33}$ and $V_{31}$ from above, $V_o$ may be expressed as: $[V_o = [A(k+1) V_{in}] - [k(V_{neg})]]$. For A chosen equal to $k/(k+1)$, $V_o$ may be seen to be:

$$V_o = k[V_{in} - V_{neg}]$$

That is, the voltage at the output of the d.c. restorer is a voltage proportional to the difference between the input voltage signal and its most negative-going excursion. The restorer output voltage corresponding input waveform of FIG. 4b is shown in FIG. 4c.

Figure 3:
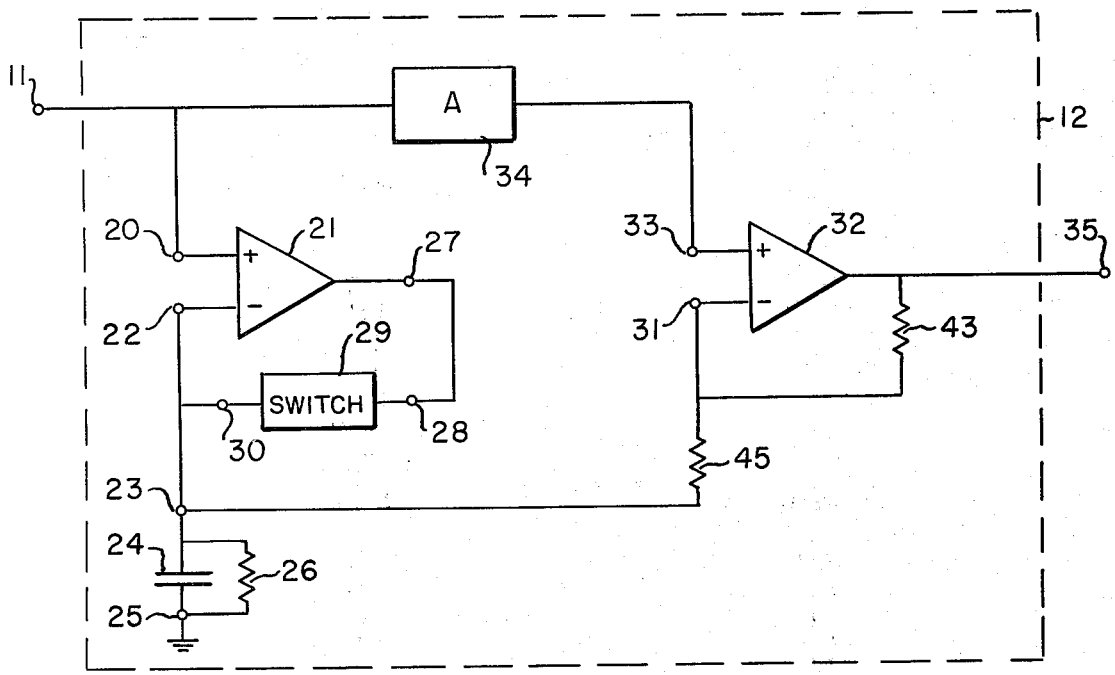
FIG. 3 is a schematic diagram of another embodiment of the d.c. restorer of the present invention.

Another embodiment of the restorer feature of the present invention is shown in FIG. 3. The overall arrangement of components is the same as that of the embodiment shown in FIG. 2 described above, except as follows: Operational amplifiers 40 and 42 have been eliminated, and their functions incorporated in amplifier 32 by addition of resistor 45 and feedback-resistor 43. Resistor 45 is added in place of amplifier 40; feedback resistor connects the output terminal 35 and the input terminal 31 of the second differential amplifier 32. Resistors 43 and 45 are each chosen so that $(R_{43}/R_{45}) = K$. When the attenuation factor A is chosen to be $A = R_{43}/(R_{43} + R_{45})$ it will be seen that the voltage at the output terminal 35 is the same as for the previously described embodiment of FIG. 2, namely: $V_o = K[V_{in} - V_{neg}]$.

This invention provides an improved traveling-wave tube protection circuit which monitors current in both collector and body portions of the tube circuit and also includes a novel d.c. restorer circuit.

Obviously, many modifications and variations of the present invention are possible in light of the above teachings. It is therefore to be understood that, within the scope of the appended claims, the invention may be practiced otherwise than as specifically described.

What is claimed is:

1. A protection circuit for an electronic device having a current path within said device comprising:
   a transformer having a primary and a secondary winding, means connecting said primary winding serially with said current path;
   a d.c. restorer circuit having an input coupled to said secondary winding;
   a comparator circuit coupled to the output of said d.c. restorer circuit and having a reference voltage generator which produces a predetermined voltage representative of current desired in said path, and providing an output signal when the voltage at the output of said restorer circuit exceeds said reference voltage;
   an integrator having an input connected to the output of said comparator and providing an output signal when said comparator output signal remains present for longer than a predetermined period of time; and
   protection means coupled to said integrator and responsive to an output signal therefrom for shutting off power to said device.

2. A protection circuit for an electronic device having a plurality of current paths within said device, comprising:
   a plurality of detection paths, each path including a transformer having a primary and a secondary winding, said primary being connected serially with one of said current paths;
   a d.c. restorer circuit having an input coupled to said secondary winding;
   a comparator circuit coupled to the output of said d.c. restorer circuit and having a reference voltage generator which produces a predetermined voltage representative of current desired in said path, and providing an output signal when the voltage at the output of said restorer circuit exceeds said reference voltage;
   an integrator having an input connected to the output of said comparator and providing an output signal when said comparator output signal remains present for longer than a predetermined period of time, the output of said integrator forming the output of said detection path;
   a decision circuit having a plurality of input terminals, and connections between different outputs of said detection paths to different input terminals of said decision circuit, said decision producing an output signal upon the occurence of a signal present at least one of said input terminals of said decision circuit; and
   protection means of shutting off power to said device upon occurence of said decision circuit output signal.

3. A protection circuit in accordance with claim 2 wherein there is provided a power supply current in each current path between said primary winding and an element of said electronic device.

4. A protection circuit in accordance with claim 3 wherein said electronic device is a traveling-wave tube and said current paths include a body current path and a collector current path.

5. A protection circuit in accordance with claim 2 wherein said electronic device is a traveling-wave tube.

6. A protection circuit in accordance with claim 4 wherein said protection means includes means to terminate power to the grid, body, and collector of said traveling wave tube.

7. A protection circuit according to claim 1 wherein said d.c. restorer comprises:
   a first differential amplifier having an inverting input, a non-inverting input, and an output;
   a second differential amplifier having an inverting input, a non-inverting input, and an output;
   reference voltage means;
   capacitive means connected between said inverting input of said first amplifier and said reference voltage means;

a first signal path interconnecting said inverting terminal of said first amplifier with said inverting terminal of said second amplifier, said first signal path including a resistance;

a second signal path interconnecting said non-inverting input of said first amplifier with said non-inverting input of said amplifier, said second signal path including an attenuation network;

a first feedback path interconnecting said output of said first amplifier with said inverting input of said first amplifier, said feedback path including a normally open voltage-controlled switch which opens whenever the current therethrough becomes less than a predetermined amount and closes whenever a predetermined voltage is applied thereto; and a resistive feedback path interconnecting said output of said second amplifier with said inverting input of said second amplifier, whereby a periodic electrical signal, when applied to said non-inverting input of said first amplifier, will have added to it a constant d.c. level and the resultant signal shall be present at said output of said second amplifier.

8. The d.c. restorer of claim 7 wherein said capacitive means comprises a capacitance and resistance in parallel.

9. The d.c. restorer of claim 7 wherein said reference voltage means is ground.

* * * * *